United States Patent
Cheng et al.

(10) Patent No.: US 8,583,398 B2
(45) Date of Patent: Nov. 12, 2013

(54) TEMPERATURE SENSING DEVICE

(75) Inventors: Chuan-Fu Cheng, Hsinchu (TW);
Hao-Chang Chang, Taipei (TW);
Hui-Yi Cheng, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 341 days.

(21) Appl. No.: 13/167,706

(22) Filed: Jun. 24, 2011

(65) Prior Publication Data
US 2012/0283983 A1 Nov. 8, 2012

(30) Foreign Application Priority Data
May 5, 2011 (TW) .............................. 100115757 A (51) Int. Cl.
*G01K 1/00* (2006.01)
(52) U.S. Cl.
USPC ............ 702/130; 374/163; 327/539; 323/315
(58) Field of Classification Search
USPC .......... 702/130; 374/163, 170, 171; 327/539; 323/315
See application file for complete search history.

(56) References Cited

U.S. PATENT DOCUMENTS

| | | | |
|---|---|---|---|
| 6,055,489 A * | 4/2000 | Beatty et al. .................. | 702/130 |
| 6,078,208 A * | 6/2000 | Nolan et al. ................... | 327/512 |
| 6,554,469 B1 * | 4/2003 | Thomson et al. ............. | 374/178 |
| 2007/0158776 A1 * | 7/2007 | Julio et al. ..................... | 257/486 |
| 2008/0259998 A1 * | 10/2008 | Venkataraman et al. ...... | 374/170 |
| 2009/0296779 A1 * | 12/2009 | Lee .................................. | 374/170 |
| 2010/0002748 A1 * | 1/2010 | Lin et al. ........................ | 374/170 |
| 2010/0164608 A1 * | 7/2010 | Shin .............................. | 327/539 |
| 2010/0271246 A1 * | 10/2010 | Chern et al. ................... | 341/147 |

* cited by examiner

*Primary Examiner* — Andrew Schechter
*Assistant Examiner* — John Kuan
(74) *Attorney, Agent, or Firm* — Jianq Chyun IP Office (57) ABSTRACT

A temperature sensing device includes a bandgap voltage generator, N mirror current sources, a temperature voltage generator, and a temperature calculating unit. The mirror current sources mirror N mirror currents according to a positive temperature coefficient current. The temperature voltage generator sets the conducting number M of the mirror current sources based on a control signal, so as to generate a temperature voltage. The temperature calculating unit gradually counts the control signal and compares a potential of the temperature voltage with a potential of a reference voltage generated by the bandgap voltage generator after counting the control signal, so as to calculate and obtain temperature information. Thus, the temperature sensing device controls the conducting number M of the mirror current sources to generate the temperature voltage instead of applying serially-connected resistors, so as to reduce a circuit area of the temperature sensing device and reduce noise.

14 Claims, 6 Drawing Sheets

TEMPERATURE SENSING DEVICE

CROSS-REFERENCE TO RELATED APPLICATION

This application claims the priority benefit of Taiwan application serial no. 100115757, filed May 5, 2011. The entirety of the above-mentioned patent application is hereby incorporated by reference herein and made a part of this specification.

BACKGROUND OF THE INVENTION

1. Field of the Invention

The invention relates to a temperature sensing device. More particularly, the invention relates to a temperature sensing device that can control the conducting number of current sources for generating a temperature voltage.

2. Description of the Related Art

A temperature sensor is an electronic device that can convert the temperature into digital information. The existing temperature sensors are developed to have the improved measurement accuracy and the reduced volume and thus have been extensively applied to various electronic equipments.

Among a variety of temperature sensors, a semiconductor-type temperature sensor obtains the ambient temperature by comparing a temperature voltage having a positive temperature coefficient with a reference voltage that is not changed together with the temperature. Here, the positive temperature coefficient is in direct proportion to the absolute temperature. The voltage having the positive temperature coefficient can be generated by a proportional-to-absolute-temperature (PTAT) circuit, and a bandgap reference circuit allows the output reference voltage not to be changed together with the temperature.

Hence, the PTAT circuit of the temperature sensor can generate the current IPTAT with the positive temperature coefficient, direct the current IPTAT to serially-connected resistors, and obtain the temperature voltage having the positive temperature coefficient from the endpoints of the serially-connected resistors. A multiplexer and a comparator of the temperature sensor are then applied to respectively obtain the corresponding temperature voltage and compare the potential of the temperature voltage with the potential of the reference voltage, so as to determine the ambient temperature.

In order to have accurate resistances, the serially-connected resistors need a relative large chip area to obtain the accurate temperature voltage generated during the current IPTAT flows through the serially-connected resistors. In case of the semiconductor process drift, the serially-connected resistors are also affected to a great extent. Besides, the more the resistors applied in the temperature sensor, the more the noise caused by the resistors. In order to design the serially-connected resistors, a pull-up resistor electrically connected to the ground voltage may need to have a resistance greater than the resistances of other serially-connected resistors, so as to significantly raise the potential of the temperature voltage for comparing the potential of the temperature voltage with the potential of the reference voltage. This accordingly expands the circuit area of the temperature sensor.

As a result, how to simultaneously improve the temperature measurement accuracy and reduce the circuit volume of the temperature sensor is an issue to be resolved in the research and development of the semiconductor-type temperature sensor.

SUMMARY OF THE INVENTION

The invention is directed to a temperature sensing device that can control the conducting number of current sources to generate a temperature voltage without applying serially-connected resistors. Thereby, a circuit area of the temperature sensing device and the noise caused by the resistors can be reduced.

In an embodiment of the invention, a temperature sensing device that includes a bandgap voltage generator, N mirror current sources, a temperature voltage generator, and a temperature calculating unit is provided. Here, N is a positive integer. The bandgap voltage generator includes a positive temperature coefficient current source. Here, the bandgap voltage generator can provide a reference voltage that is irrelevant to the temperature. Control ends of the N mirror current sources are coupled to a control end of the positive temperature coefficient current source, and the positive temperature coefficient current source and the mirror current sources constitute a current mirror, so as to mirror N mirror currents based on a positive temperature coefficient current generated by the positive temperature coefficient current source.

The temperature voltage generator is coupled to the mirror current sources and sets the conducting number M of the mirror current sources based on a control signal to generate a temperature voltage. Here, M is a non-negative integer, and M≤N. A potential of the temperature voltage is determined based on the conducting number M of the mirror current sources. The temperature calculating unit is coupled to the bandgap voltage generator and the temperature voltage generator, and the temperature calculating unit gradually counts the control signal. The temperature calculating unit compares a potential of the reference voltage with the potential of the temperature voltage after counting the control signal, so as to calculate and obtain digital temperature information.

According to an embodiment of the invention, the temperature voltage generator includes a first resistor and a current switch unit. A first end of the first resistor receives a ground voltage, and a second end of the first resistor is a temperature voltage output end. The current switch unit is coupled to the mirror current sources and the temperature voltage output end and determines whether the mirror current sources and the temperature voltage output end are conducted respectively based on the control signal, so as to direct the M mirror currents to the first resistor and provide the temperature voltage.

According to an embodiment of the invention, the temperature sensing device further includes a pull-up current source. An output end of the pull-up current source is coupled to the first end of the first resistor, and a control end of the pull-up current source is coupled to the control end of the positive temperature coefficient current source, such that the positive temperature coefficient current source and the pull-up current source constitute a current mirror as well. Thereby, the pull-up current source can mirror a pull-up current based on the positive temperature coefficient current. Here, the temperature voltage is determined based on the pull-up current, the M mirror currents, and the first resistor.

Based on the above, the temperature sensing device described in the embodiments of the invention can determine the conducting number of the current sources and allow the currents to flow through the resistors for generating the temperature voltage. The temperature voltage is then compared with the reference voltage that is not changed together with the temperature, so as to obtain the digital temperature information. In conclusion, according to the embodiments of the invention, the serially-connected resistors are not applied in the temperature sensing circuit for generating the temperature voltage, and thereby the circuit area of the temperature sensing device, the noise caused by the resistors, and the influence of the semiconductor process drift can all be reduced.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Descriptions of the invention are given with reference to the exemplary embodiments illustrated with accompanied drawings, wherein same or similar parts are denoted with same reference numerals. Moreover, elements/components/notations with same reference numerals represent same or similar parts in the drawings and embodiments.

Figure 1:
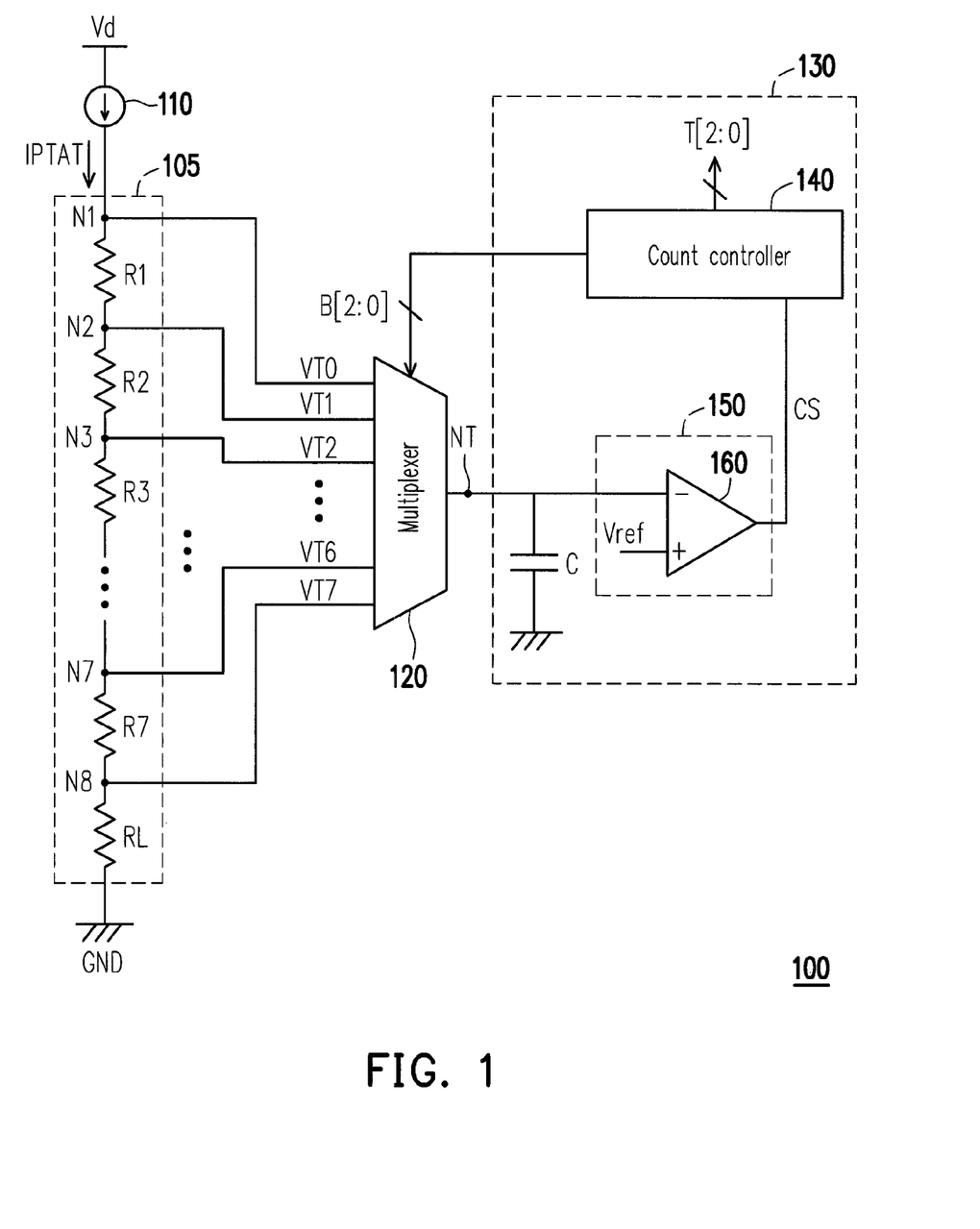
FIG. 1 is a diagram of a temperature sensing circuit.

FIG. 1 is a diagram of a temperature sensing circuit 100. As indicated in FIG. 1, the temperature sensing circuit 100 includes a positive temperature coefficient current source 110, a multiplexer 120, a temperature calculating unit 130, serially-connected resistors R1~R7, and a pull-up resistor RL. The serially-connected resistors R1~R7 and the pull-up resistor RL are collectively referred to as a serial resistor 105. The temperature calculating unit 130 includes a count controller 140 and a comparator 150. In this embodiment, the comparator 150 exemplarily refers to an operational amplifier 160, which should not be construed as a limitation to the invention. A reference voltage Vref of this embodiment is generated by a bandgap reference circuit (not shown).

In this embodiment, seven resistors R1~R7 and the pull-up resistor RL serve as the serial resistor 105, while the number of the serially-connected resistors in the serial resistor 105 can be determined based on design requirements, and the multiplier 120 and the control signal B[2:0] described below can be correspondingly adjusted. This should not be construed as a limitation in this embodiment.

The positive temperature coefficient current source 110 of the temperature sensing device 100 can thus generate a positive temperature coefficient current IPTAT that is in direct proportion to the absolute temperature and can direct the positive temperature coefficient current IPTAT to the serial resistor 105. Accordingly, the temperature voltages VT0~VT7 each having the positive temperature coefficient can be provided by endpoints N1~N8 of the serial resistor 105. In this embodiment, the positive temperature coefficient current IPTAT is 3 µA approximately. For instance, the value of the temperature voltage VT0 is calculated by multiplying the sum of the resistances in the serial resistor 105 by the amount of the positive temperature coefficient current IPTAT. The value of the temperature voltage VT6 is calculated by multiplying the sum of the resistances of the resistor R7 and the pull-up resistor RL by the amount of the positive temperature coefficient current IPTAT.

The count controller 140 of the temperature calculating unit 130 gradually counts the control signal increasingly and resets the value of the control signal to zero after the maximum value of the control signal is obtained. Here, the control signal of the temperature calculating unit 130 refers to the control signal B[2:0] in this embodiment, while the number of the bit lines is not limited herein. Thereby, the multiplexer 120 sequentially outputs the temperature voltages VT0~VT7 to the temperature voltage output end NT of the multiplexer 120 based on the control signal B[2:0] counted by the count controller 140. After each count, the comparator 150 of the temperature calculating unit 130 compares the potential of the reference voltage Vref with the potential of the temperature voltage, so as to calculate and obtain digital temperature information T[2:0]. To reduce the glitch in the switching process of the multiplexer 120, the temperature voltage output end NT of this embodiment is coupled to a capacitor C, and thereby the glitch can be reduced by capacitance compensation.

Figure 2:
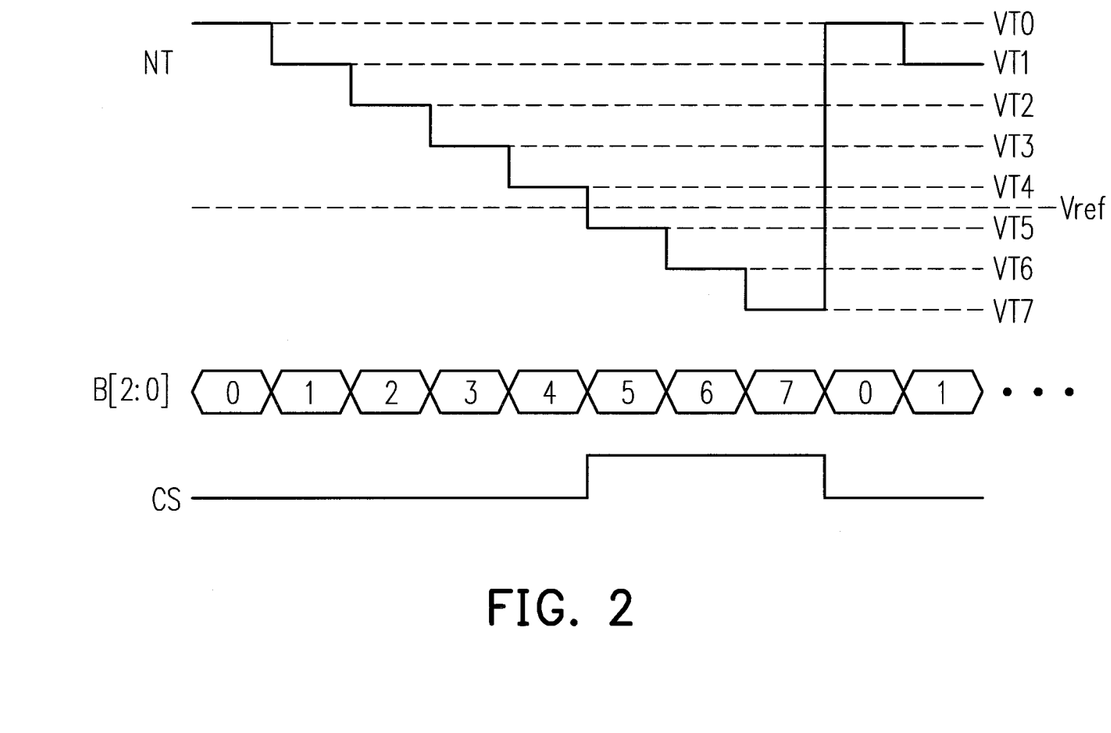
FIG. 2 is a timing diagram of a temperature sensing device.

The way to enable the temperature calculating unit 130 is described in detail below. FIG. 2 is a timing diagram of a temperature sensing device. With reference to FIG. 2, based on the control signal B[2:0] counted by the count controller 140, the multiplexer 120 outputs the corresponding temperature voltage to the temperature voltage output end NT of the multiplexer 120. Thereby, once the count controller 140 counts the control signal B[2:0], the comparator 150 can compare the potential of the temperature voltages VT0~VT7 with the potential of the reference voltage Vref (irrelevant to the temperature), so as to generate a comparing signal CS.

In order to describe the enabling correlation between the comparing signal CS and the count controller 140 and elaborate the invention, it is assumed that the value of the reference voltage Vref is slightly greater than the value of the temperature voltage VT5 but is slightly less than the value of the temperature voltage VT4. As indicated in FIG. 2, when the control signal B[2:0] sequentially obtained by the count controller 140 is 0~4, the comparing signal CS output by the comparator 150 remains disabled because the values of the temperature voltages VT0~VT4 output by the multiplexer 120 based on the control signal B[2:0] are all greater than the value of the reference voltage Vref. In this embodiment, the comparing signal CS is disabled when the comparing signal CS has a logic level "0", which should not be construed as a limitation to the invention.

When the control signal B[2:0] obtained by the count controller 140 is 5, the comparing signal CS output by the comparator 150 is then enabled because the value of the temperature voltage VT5 is less than the value of the reference voltage Vref. Here, the comparing signal CS is enabled when the comparing signal CS has a logic level "1". Based on the counted control signal B[2:0] (i.e., "5" in this embodiment), the count controller 140 can calculate and obtain the corresponding digital temperature information T[2:0] by means of the equation or the temperature comparison chart built in the count controller 140, so as to obtain the ambient temperature obtained by the temperature sensing device 100.

Nonetheless, if the temperature voltages VT0~VT7 are to be accurately measured, and the influence of the semiconductor process drift is to be mitigated, the large-size serial resistor 105 needs to be applied in the temperature sensing device 100, and thereby the resistance of the serial resistor 105 can be accurately calculated. The noise possibly generated by one resistor is 4×k(Boltzman's constant)×T(absolute temperature)×R(resistance) approximately. Therefore, the more the resistors applied in the temperature sensing device 100, the greater the resistances. Consequently, the noise caused by the resistances increases. To compare the potential of the temperature voltages VT0~VT7 with the potential of the reference voltage Vref, the pull-up resistor RL is required to have a resistance greater than the resistances of other serially-connected resistors, so as to significantly raise the potential of the temperature voltages VT0~VT7.

In order not to use the serially-connected resistors for generating the temperature voltage, the temperature sensing device of this embodiment can control the conducting number of the current sources, and thereby the currents can flow through the resistor to generate the temperature voltages. Thereafter, the temperature voltages are compared with the reference voltage Vref, so as to obtain the digital temperature information. That is to say, according to the embodiments of the invention, a plurality of positive temperature coefficient mirror currents are mirrored by a current mirror, and the amount of the currents directed to the resistor is determined based on the control signal. As such, the corresponding temperature voltages can be sequentially generated without using the serially-connected resistors.

Figure 3:
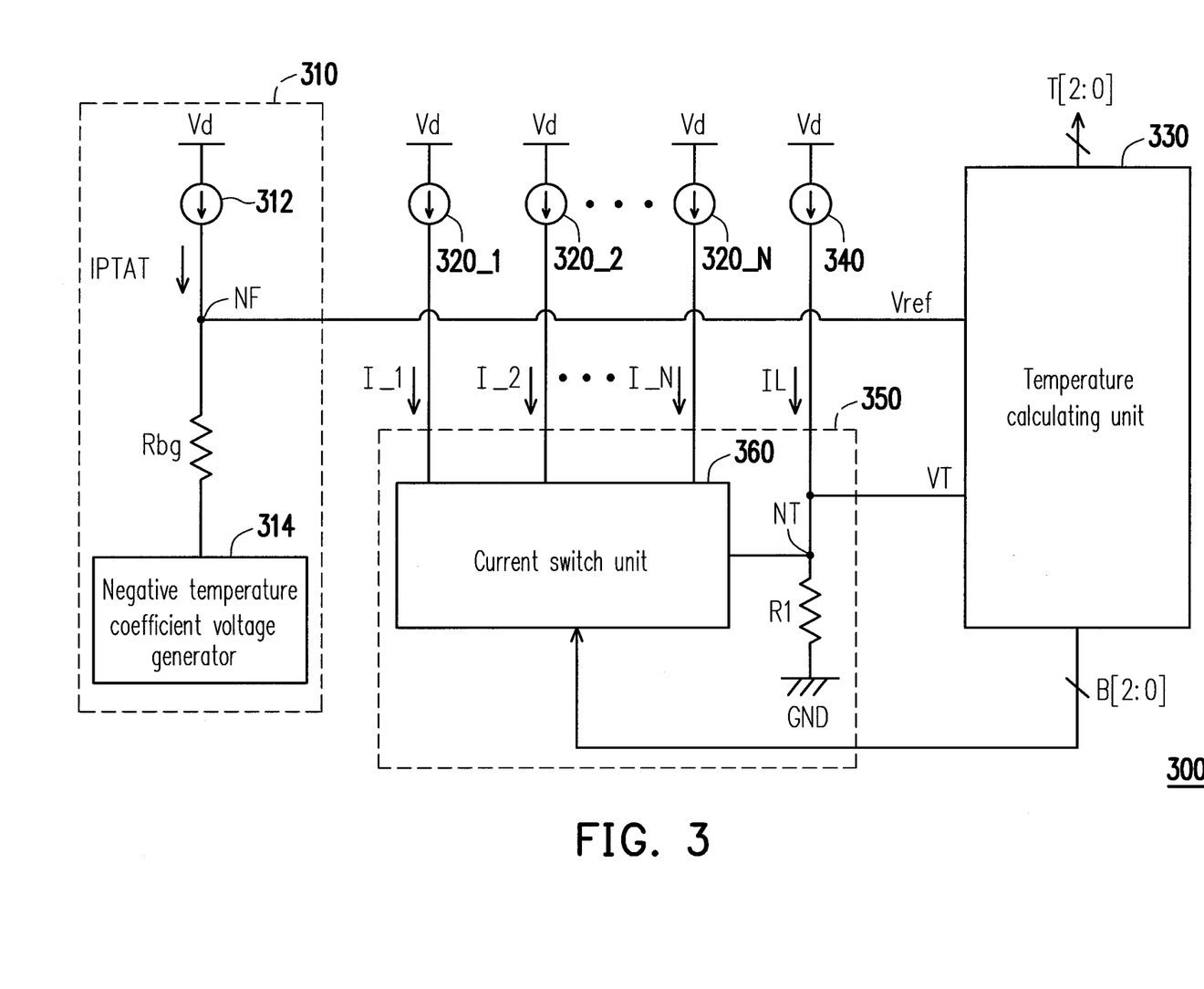
FIG. 3 is a block diagram illustrating a temperature sensing device according to a first embodiment of the invention.

FIG. 3 is a block diagram illustrating a temperature sensing device 300 according to a first embodiment of the invention. With reference to FIG. 3, the temperature sensing device 300 includes a bandgap voltage generator 310, N mirror current sources 320_1~320_N, a temperature voltage generator 350, and a temperature calculating unit 330. Here, N is a positive integer. The temperature voltage generator 350 includes a current switch unit 360 and a first resistor R1. In this embodiment, the temperature sensing device 300 further includes a pull-up current source 340. The temperature calculating unit 330 is similar to the temperature calculating unit 130 depicted in FIG. 1, and therefore no further description is given herein.

The bandgap voltage generator 310 can provide the reference voltage Vref that is irrelevant to the temperature. In a variety of analog circuits, the bandgap voltage generator 310 (also referred to as a bandgap reference circuit) often carries out temperature compensation by means of the positive temperature coefficient circuit that is in direct proportion to the absolute temperature and the negative temperature coefficient circuit that is in an inverse proportion to the absolute temperature, such that the reference voltage Vref is not changed together with the temperature.

Here, the bandgap voltage generator 310 depicted in FIG. 3 exemplarily acts as the bandgap reference circuit in this embodiment, and the bandgap voltage generator 310 includes a positive temperature coefficient current source 312, a bandgap resistor Rbg, and a negative temperature coefficient voltage generator 314. The power supply end of the positive temperature coefficient current source 312 receives a power voltage Vd, and an output end of the positive temperature coefficient current source 312 is coupled to a first end of the bandgap resistor Rbg. Namely, the output end of the positive temperature coefficient current source 312 is coupled to the reference voltage output end NF. A first end of the negative temperature coefficient voltage generator 314 is coupled to a second end of the bandgap resistor Rbg. Here, the negative temperature coefficient voltage generator 314 can provide a negative temperature coefficient voltage VIPT to the second end of the bandgap resistor Rbg.

In view of said design, the positive temperature coefficient current IPTAT can be compensated by the negative temperature coefficient voltage VIPT, so as to generate the reference voltage Vref that is irrelevant to the temperature. The value of the reference voltage Vref can be calculated by applying the following equation (1):

$$Vref = IPTAT \times Rbg + VIPT \quad (1)$$

The mirror current sources 320_1~320_N and the pull-up current source 340 are described below. To generate the mirror currents relevant to the positive temperature coefficient current IPTAT, control ends of N mirror current sources 320_1~320_N are coupled to a control end of the positive temperature coefficient current source 312 (not shown), and the power supply end of each of the mirror current sources 320_1~320_N receives the power voltage Vd. Thereby, the positive temperature coefficient current source 312 and the mirror current sources 320_1~320_N together constitute a current mirror. Based on the positive temperature coefficient current IPTAT, the mirror current sources 320_1~320_N can mirror N mirror currents I_1~I_N.

Here, the dimensional ratio (also referred to as the mirror ratio in this embodiment) of the transistor in the positive temperature coefficient current source 312 to the transistors in the mirror current sources 320_1~320_N can be adjusted based on actual requirements, and thereby the amount of the mirror currents I_1~I_N can be modulated. In this embodiment, the mirror ratio is set as 4:1, i.e., the amount of each mirror current I_1~I_N is ¼ of the amount of the positive temperature coefficient current IPTAT, which should not be construed as a limitation to the invention.

Similarly, the pull-up current source 340 and the positive temperature coefficient current source 312 can together constitute the mirror current, and the control end of the pull-up current source 340 is coupled to the control end of the positive temperature coefficient current source 312 (not shown). The power supply end of the pull-up current source 340 receives the power voltage Vd, and the output end of the pull-up current source 340 is coupled to the first end of the first resistor R1 (i.e., coupled to the temperature voltage output end NV), so as to generate a pull-up current IL.

Owing to the mirror current effect, the pull-up current IL is proportional to the positive temperature coefficient current IPTAT in response to the dimensional ratio of the transistor in the pull-up current source 340 to the transistor in the positive temperature coefficient current source 312. Here, the proportion of the pull-up current IL to the positive temperature coefficient current IPTAT is referred to as a pull-up ratio. The pull-up current IL mainly serves to raise the potential of the temperature voltage VT, such that the potential of the temperature voltage can be well compared with the potential of the reference voltage Vref. Hence, the pull-up ratio is determined based on the potential of the reference voltage Vref, the resistance of the first resistor R1, and the measurement of the actual temperature. In this embodiment, the pull-up ratio is approximately 12:19, which should not be construed as a limitation to the invention.

The temperature voltage generator 350 is coupled to the mirror current sources 320_1~320_N and the output end of the pull-up current source 340 and receives the control signal B[2:0] calculated and obtained by the temperature calculating unit 330. The temperature voltage generator 350 adjusts and configures the conducting number M of the minor current sources 320_1~320_N based on the control signal B[2:0], and thereby the temperature voltages that are to be compared with the reference voltage Vref are sequentially generated. Here, M is a non-negative integer, and M≤N.

The way to enable the temperature voltage generator 350 is elaborated hereinafter. A first end of the first resistor R1 receives a ground voltage GND, and a second end of the first resistor R1 is the temperature voltage output end NT. The current switch unit 360 is coupled to the output ends of the mirror current sources 320_1~320_N and the temperature voltage output end NT. Based on the control signal B[2:0] calculated by the temperature calculating unit 330, the current switch unit 360 determines whether the output ends of the mirror current sources 320_1~320_N and the temperature voltage output end NV are conducted respectively, so as to select M mirror currents from the mirror currents I_1~I_N and direct the M mirror currents to the first resistor R1.

Thereby, the value of the temperature voltage VT at the temperature voltage output end NT can be determined based on the M mirror currents, the pull-up current IL generated by the pull-up current source 340, and the first resistor R1. The value of the temperature voltage VT is represented by the following equation (2), and it is assumed that the amount of each mirror current I_1~I_N is 1.

$$VT = (I \times M + IL) \times R1 \quad (2)$$

The temperature voltage generator 350 can then control the mirror current sources 320_1~320_N and generate the temperature voltage VT based on the control signal B[2:0]. Here, the temperature voltage VT generated by the temperature voltage generator 350 is to be compared with the reference voltage Vref.

Figure 4:
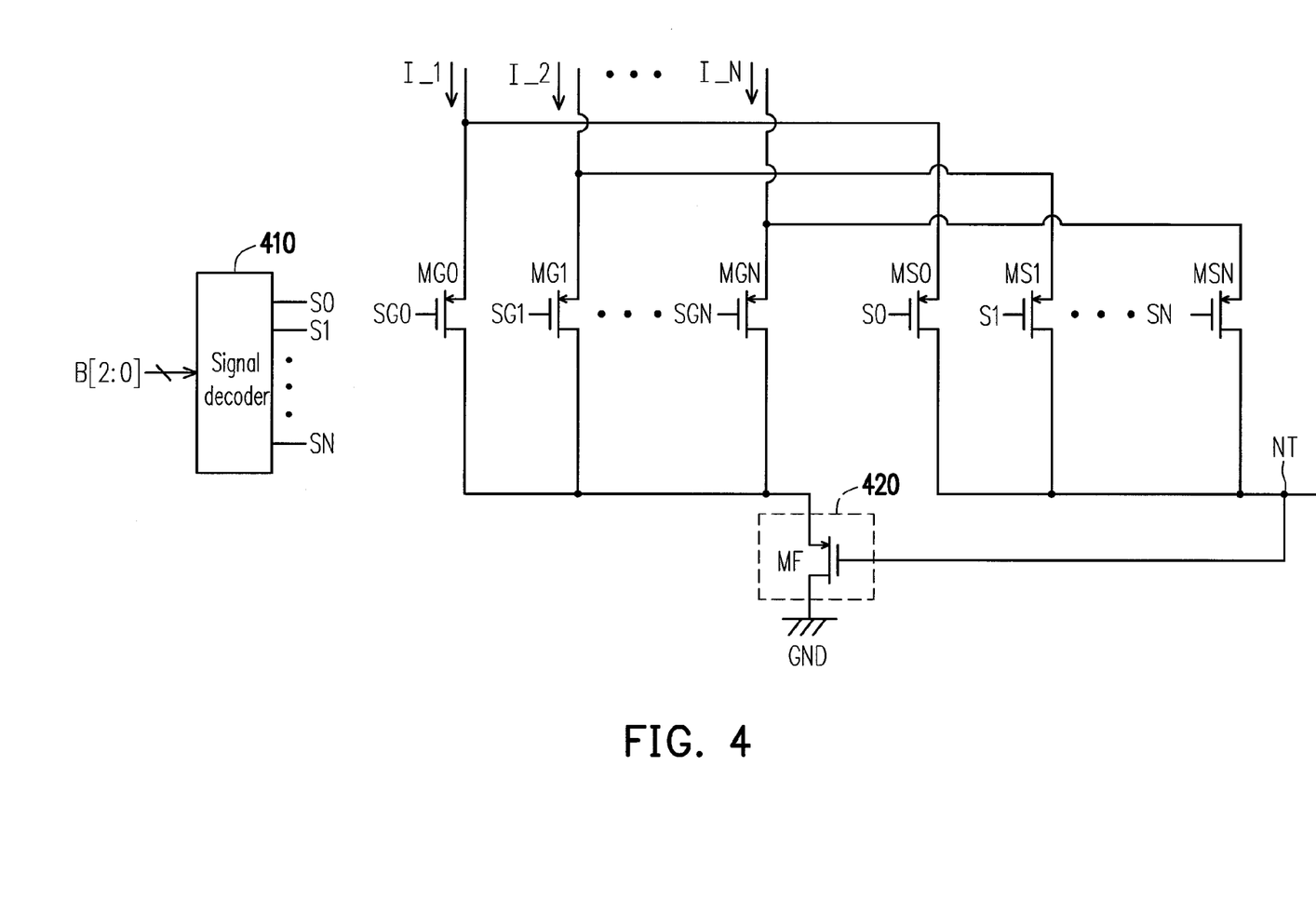
FIG. 4 is a circuit diagram of the current switch unit as depicted in FIG. 3.

The circuit structure of the current switch unit 360 and the way to enable the current switch unit 360 are described hereinafter. FIG. 4 is a circuit diagram of the current switch unit 360 as depicted in FIG. 3. As indicated in FIG. 4, the current switch unit 360 includes a signal decoder 410, N directing switches (e.g., transistors MS0~MSN), N ground switches (e.g., transistors MG0~MGN), and a current steering unit. Here, a voltage follower 420 (e.g., a transistor MF) exemplarily acts as the current steering unit. In this embodiment, the transistors MS0~MSN, the transistors MG0~MGN, and the transistor MF are P-channel metal oxide semiconductor field effect transistors (MOSFETs), which should not be construed as a limitation to the invention. Namely, N-channel MOSFETs are applicable in this embodiment.

The signal decoder 410 receives the control signal B[2:0] calculated by the temperature calculating unit 330 and decodes the control signal to obtain N selecting signals S0~SN. Certainly, given the temperature calculating unit 330 directly provides the selecting signals S0~SN to the current switch unit 360, it is not necessary for the current switch unit 360 to be equipped with the signal decoder 410.

A first end (i.e., the source) of the $i^{th}$ directing switch MSi and a first end of the $i^{th}$ ground switch MGi are coupled to the output end of the $i^{th}$ mirror current source 320_$i$ depicted in FIG. 3. Here, i is a positive integer, and 1≤i≤N. Second ends (i.e., the drains) of the directing switches MS0~MSN are coupled to the temperature voltage output end NT, and second ends (i.e., the drains) of the ground switches MG0~MGN are coupled to a first end of the voltage follower 420 (i.e., the source of the transistor MF). Control ends (i.e., the gates) of the directing switches MS0~MSN are coupled to the selecting signals S0~SN, respectively, and control ends (i.e., the gates) of the ground switches MG0~MGN are coupled to ground signals SG0~SGN, respectively.

A second end of the voltage follower 420 (i.e., the drain of the transistor MF) is coupled to the ground voltage GND, and a control end of the voltage follower 420 (i.e., the gate of the transistor MF) is coupled to the temperature voltage output end NT. The $i^{th}$ selecting signal Si and the $i^{th}$ ground signal SGi have opposite phases. Namely, when the $i^{th}$ selecting signal Si has the logic level "1", the $i^{th}$ ground signal SGi has the logic level "0", and vice versa. Based on the control signal B[2:0], the current switch unit 360 can generate the selecting signals S0~SN, select M mirror currents from the N mirror currents I_1~I_N, and direct the M mirror currents to the first resistor R1. For instance, when the selecting signal S0 is enabled (i.e., the selecting signal S0 has the logic level "0"), the directing switch MS0 is switched on to direct the mirror current I_1 to the reference voltage output end NT, and the ground switch MG0 is closed because the ground signal SG0 is disabled (i.e., the ground signal SG0 has the logic level "1").

Besides, in order to frequently operate the mirror current sources 320_1~320_N depicted in FIG. 3 in a saturation region and prevent the mirror current sources 320_1~320_N from entering a diode region or a cut-off region, the voltage follower 420 (also referred to as a source follower) is applied to direct the mirror currents that are not yet directed to the first resistor R1 to the ground end. Another advantage of using the voltage follower 420 lies in that the channel length modulation caused by different voltages can be better prevented when the mirror current sources 320_1~320_N are switched.

Figure 5:
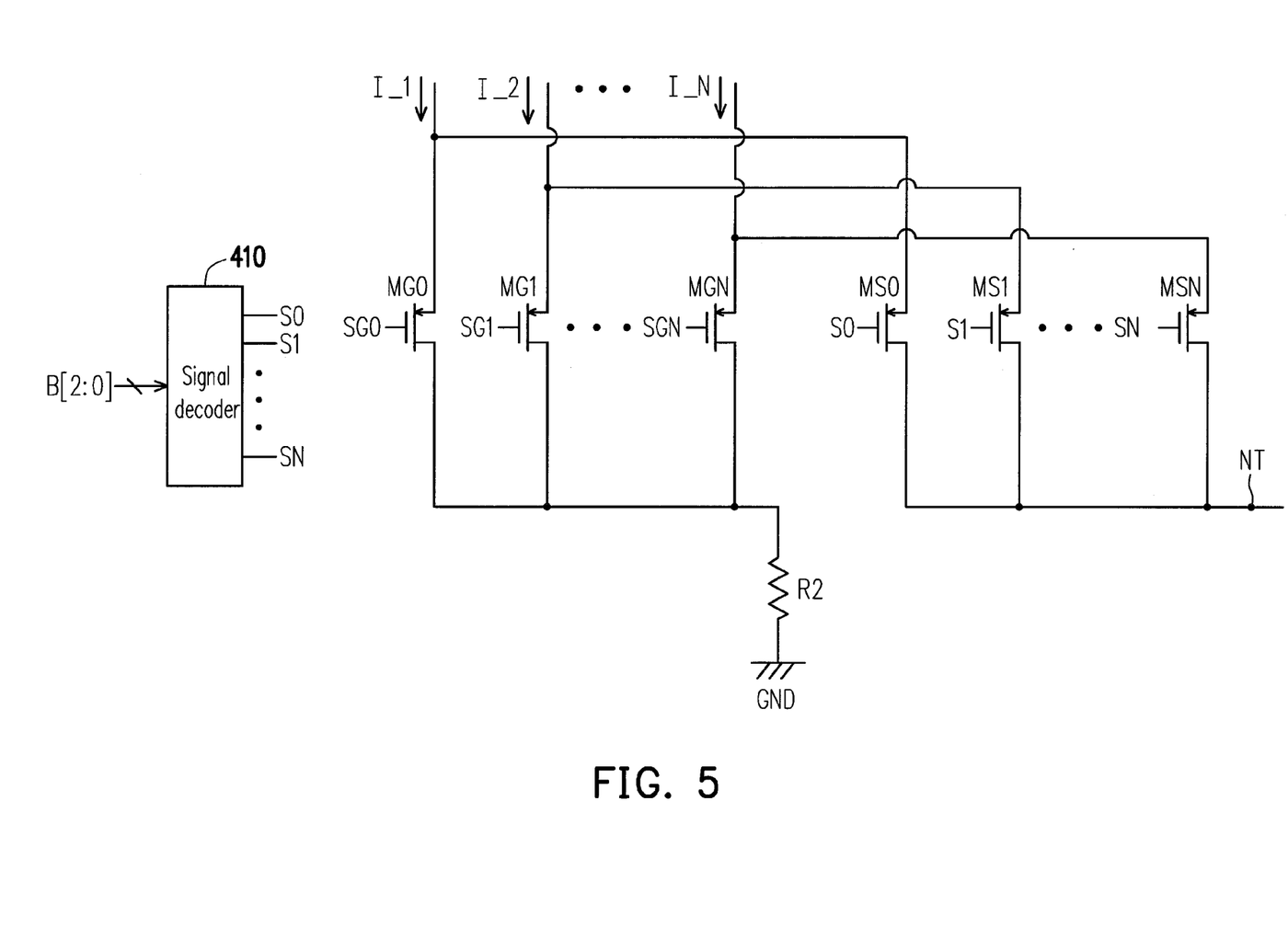
FIG. 5 is a circuit diagram of the current switch unit as depicted in FIG. 3 according to another embodiment of the invention.

FIG. 5 is a circuit diagram of the current switch unit 360 as depicted in FIG. 3 according to another embodiment of the invention. Since FIG. 5 and FIG. 4 are similar, the similarity is not reiterated herein. The difference therebetween lies in that the current steering unit of the current switch unit 360 can be a resistor R2, for instance. In this case, however, the mirror current sources 320_1~320_N are likely to enter the diode region or the cut-off region, and therefore the resistance of the resistor R2 needs to be adjusted.

Figure 6:
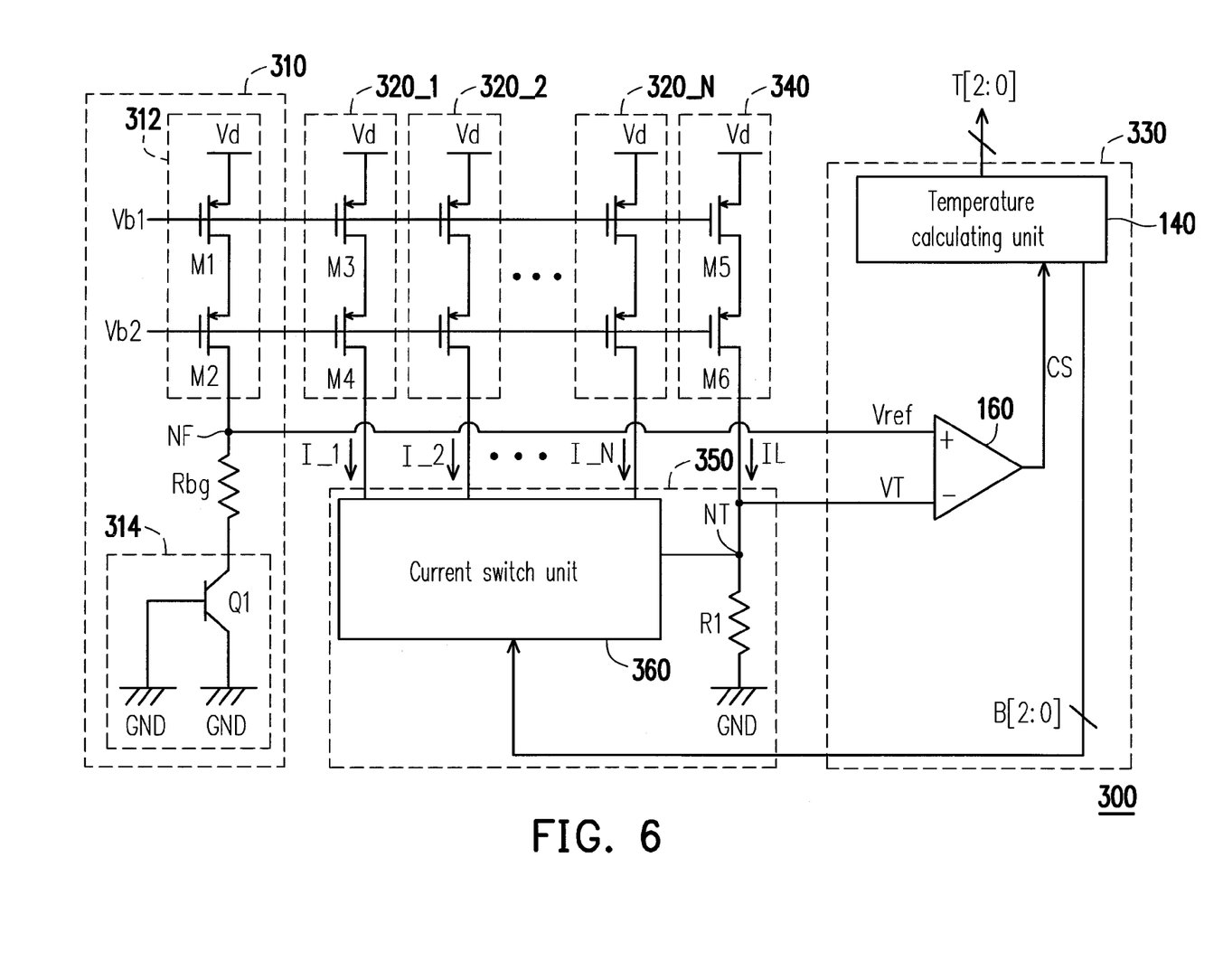
FIG. 6 is a circuit diagram of a temperature sensing device according to the first embodiment of the invention.

FIG. 6 is a circuit diagram of a temperature sensing device 300 according to the first embodiment of the invention. As shown in FIG. 6, the bandgap voltage generator 310, N mirror current sources 320_1~320_N, and the pull-up current source 340 can be semiconductor devices (e.g., P-channel MOSFETs, bipolar joint transistors (BJTs), and so forth).

The positive temperature coefficient current source 312 of the bandgap voltage generator 310 includes transistors M1 and M2. Control ends (i.e., the gates) of the transistors M1 and M2 respectively receive a first bias Vb1 and a second bias Vb2. A first end (i.e., the source) and a second end (i.e., the drain) of the transistor M1 are respectively coupled to the power voltage Vd and a first end (i.e., the source) of the transistor M2, and a second end (i.e., the drain) of the transistor M2 is the output end of the positive temperature coefficient current source 312.

In addition, the negative temperature coefficient voltage generator 314 of the bandgap voltage generator 310 can be a BJT Q1. An emitter of the BJT Q1 is the first end of the negative temperature coefficient voltage generator 314 and provides the ground voltage GND to a base and a collector of the BJT Q1. That is to say, the base and the collector of the BJT Q1 receive the ground voltage GND.

In the bandgap voltage generator 310, the amount of the drain current generated by the two serially-connected transistors M1 and M2 is increased together with the rising temperature, and the potential of a cross-voltage (i.e., the negative temperature coefficient voltage VIPT) between the emitter and the base of the BJT Q1 is reduced in response to the rising temperature. The reduced potential of the cross-voltage can be compensated by the bandgap voltage generator 310, such that the reference voltage Vref is not changed together with the temperature.

In this embodiment, each of the mirror current sources 320_1~320_N is identical, and thus the mirror current source 320_1 is taken as an example for describing the invention below. With reference to FIG. 6, the mirror current source 320_1 includes transistors M3 and M4. Similar to the control ends of the transistors M1 and M2, control ends (i.e., the gates) of the transistors M3 and M4 respectively receive the first bias Vb1 and the second bias Vb2. A first end (i.e., the source) and a second end (i.e., the drain) of the transistor M3 are coupled to a first end (i.e., the source) of the transistor M4, and a second end (i.e., the drain) of the transistor M4 is the output end of the mirror current source 320_1.

The transistors M5 and M5 in the pull-up current source 340 are also similar to the transistors M3 and M4, while the difference therebetween lies in that the drain of the transistor M6 is coupled to the second end of the first resistor R1. Besides, the dimensional ratios (i.e., the mirror ratios) of the transistors M1, M2, M3, and M4 and the dimensional ratios (i.e., the pull-up ratios) of the transistors M1, M2, M5, and M6 can be adjusted based on actual requirements.

To sum up, in the temperature sensing device 300 described in this embodiment, the current sources form the current mirror replace the serially-connected resistor to generate the temperature voltage. Since the semiconductor process drift is less influential than the noise caused by the resistors, the small-size transistors can be applied to reduce the circuit area of the temperature sensing device, and favorable sensing accuracy can still be achieved.

Besides, in most cases, the amount of the positive temperature coefficient current IPTAT is rather small (approximately 3 μA). In order to increase the value of the temperature voltage, the resistances of the serially-connected resistors are significantly increased according to the related art, and thus the circuit area is correspondingly expanded. By contrast, in this embodiment, the value of the temperature voltage can be increased by adjusting the dimensional ratios of the transistors; therefore, the circuit area can be reduced. Moreover, the M noise caused by transistor devices can be roughly represented by the following equation (3).

$$M\_noise = 4 \times k \times T \times r \times g_m = 4 \times k \times T \times r \times [2(kI)^{1/2}] \quad (3)$$

As such, the noise in the temperature sensing device 300 is less than the noise in the temperature sensing device 100 (shown in FIG. 5) in which the serial resistor 105 is applied.

In light of the foregoing, the temperature sensing device described in the embodiments of the invention can determine the conducting number of the current sources and allow the currents to flow through the resistors for generating the temperature voltage. The temperature voltage is then compared with the reference voltage that is not changed together with the temperature, so as to obtain the digital temperature information. Hence, according to the embodiments of the invention, the serially-connected resistors are not applied in the temperature sensing circuit for generating the temperature voltage, and thereby the circuit area of the temperature sensing device, the noise caused by the resistors, and the influence of the semiconductor process drift can all be reduced.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. A temperature sensing device comprising:
a bandgap voltage generator for providing a reference voltage, the bandgap voltage generator comprising a positive temperature coefficient current source;
N mirror current sources, control ends of the mirror current sources being coupled to a control end of the positive temperature coefficient current source, so as to mirror N mirror currents based on a positive temperature coefficient current generated by the positive temperature coefficient current source, wherein N is a positive integer;
a temperature voltage generator coupled to the mirror current sources, the temperature voltage generator setting a conducting number M of the mirror current sources based on a control signal, so as to generate a temperature voltage, a potential of the temperature voltage being determined based on the conducting number M of the mirror current sources, wherein M is a non-negative integer, and M≤N; and
a temperature calculating unit coupled to the bandgap voltage generator and the temperature voltage generator, the temperature calculating unit gradually counting the control signal and comparing a potential of the reference voltage with the potential of the temperature voltage after counting the control signal, so as to calculate and obtain temperature information.

2. The temperature sensing device as recited in claim 1, wherein the temperature voltage generator comprises:
a first resistor, a first end of the first resistor receiving a ground voltage, a second end of the first resistor being a temperature voltage output end; and
a current switch unit coupled to the mirror current sources and the temperature voltage output end, the current switch unit determining whether the mirror current sources and the temperature voltage output end are conducted respectively based on the control signal, so as to direct the M mirror currents to the first resistor and provide the temperature voltage.

3. The temperature sensing device as recited in claim 2, further comprising:
a pull-up current source, a control end of the pull-up current source being coupled to the control end of the positive temperature coefficient current source, an output end of the pull-up current source being coupled to the temperature voltage output end, the pull-up current source mirroring a pull-up current based on the positive temperature coefficient current, wherein the temperature voltage is determined based on the pull-up current, the M mirror currents, and the first resistor.

4. The temperature sensing device as recited in claim 3, wherein a pull-up ratio of the pull-up current to the positive temperature coefficient current is determined based on the potential of the reference voltage and a resistance of the first resistor.

5. The temperature sensing device as recited in claim 2, wherein the current switch unit comprises:
N directing switches, a first end of an $i^{th}$ directing switch of the N directing switches being coupled to an output end of an $i^{th}$ mirror current source of the N mirror current sources, second ends of the N directing switches being coupled to the temperature voltage output end, the first and second ends of the $i^{th}$ directing switch being conducted based on an $i^{th}$ selecting signal in the control signal, wherein i is a positive integer, and 1≤i≤N.

6. The temperature sensing device as recited in claim 5, wherein the current switch unit further comprises:

N ground switches, a first end of an $i^{th}$ ground switch of the N ground switches being coupled to the output end of the $i^{th}$ mirror current source, the first end and a second end of the $i^{th}$ ground switch being conducted based on an $i^{th}$ ground signal in the control signal, wherein the $i^{th}$ selecting signal and the $i^{th}$ ground signal have opposite phases; and a current steering unit, a first end and a second end of the current steering unit being respectively coupled to the second ends of the ground switches and a ground end, wherein the current steering unit directs the mirror currents which are not directed to the first resistor to the ground end.

7. The temperature sensing device as recited in claim 6, wherein the current steering unit comprises:
a source follower, a control end of the source follower being coupled to the temperature voltage output end, a first end and a second end of the source follower being respectively coupled to the second ends of the ground switches and the ground voltage.

8. The temperature sensing device as recited in claim 6, wherein the current steering unit comprises:
a second resistor, a first end and a second end of the second resistor being respectively coupled to the second ends of the ground switches and the ground voltage.

9. The temperature sensing device as recited in claim 2, wherein the temperature voltage generator further comprises:
a signal decoder for decoding the control signal to obtain N selecting signals.

10. The temperature sensing device as recited in claim 1, wherein the bandgap voltage generator further comprises:
a bandgap resistor, a first end of the bandgap resistor being coupled to the positive temperature coefficient current source, the first end of the bandgap resistor being a reference voltage output end; and
a negative temperature coefficient voltage generator, a first end of the negative temperature coefficient voltage generator being coupled to a second end of the bandgap resistor, so as to generate a negative temperature coefficient voltage,
wherein the reference voltage is obtained by first multiplying the positive temperature coefficient current by a resistance of the bandgap resistor and then adding a value of the negative temperature coefficient voltage to the product of the positive temperature coefficient current and the resistance of the bandgap resistor.

11. The temperature sensing device as recited in claim 10, wherein the negative temperature coefficient voltage generator is a bipolar junction transistor, a base and a collector of the bipolar junction transistor receive the ground voltage, and an emitter of the bipolar junction transistor is the first end of the negative temperature coefficient voltage generator.

12. The temperature sensing device as recited in claim 1, wherein the positive temperature coefficient current source comprises:
a first transistor, a control end of the first transistor receiving a first bias, a first end of the first transistor being coupled to a power voltage; and
a second transistor, a control end of the second transistor receiving a second bias, a first end of the second transistor being coupled to a second end of the first transistor, a second end of the second transistor being an output end of the positive temperature coefficient current source.

13. The temperature sensing device as recited in claim 12, wherein an $i^{th}$ mirror current source of the N mirror current sources comprises:
a third transistor, a control end of the third transistor receiving the first bias, a first end of the third transistor being coupled to the power voltage; and
a fourth transistor, a control end of the fourth transistor receiving the second bias, a first end of the fourth transistor being coupled to a second end of the third transistor, a second end of the fourth transistor being an output end of the $i^{th}$ mirror current source, wherein an aspect ratio of the first transistor and an aspect ratio of the third transistor are mirror ratios, i is a positive integer, and $1 \leq i \leq N$.

14. The temperature sensing device as recited in claim 1, wherein the temperature calculating unit comprises:
a count controller for gradually counting the control signal increasingly; and
a comparator, a first end of the comparator being coupled to the reference voltage output end, an output end of the comparator being coupled to the count controller, a second end of the comparator being coupled to the temperature voltage output end, the comparator comparing the potential of the reference voltage with the potential of the temperature voltage after counting the control signal, so as to generate a comparing signal, wherein when the comparing signal and the control signal have opposite phases, a logic count unit calculates and generates the temperature information based on the control signal counted by the count controller.

* * * * *